A. H. McALLISTER.
Improvement in Whiffletrees for Detaching Horses from Vehicles.
No. 132,592. Patented Oct. 29, 1872.
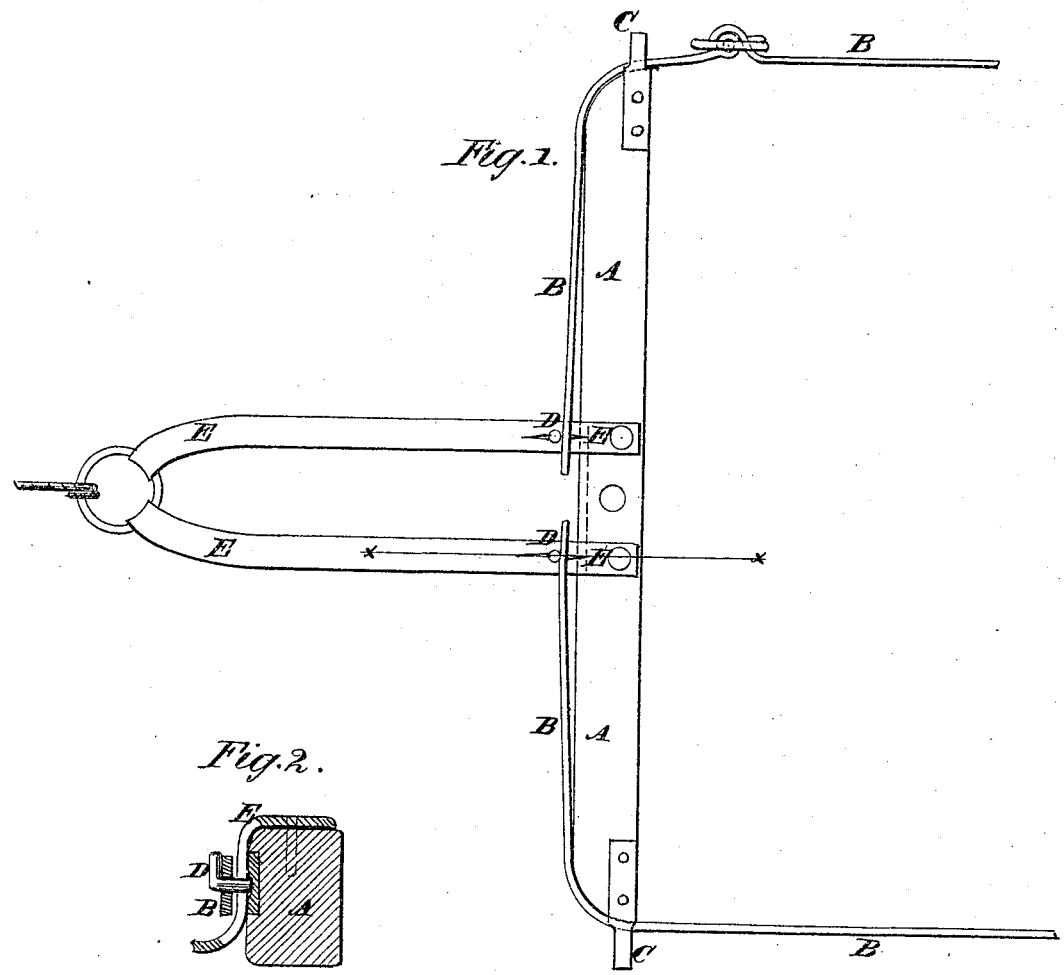
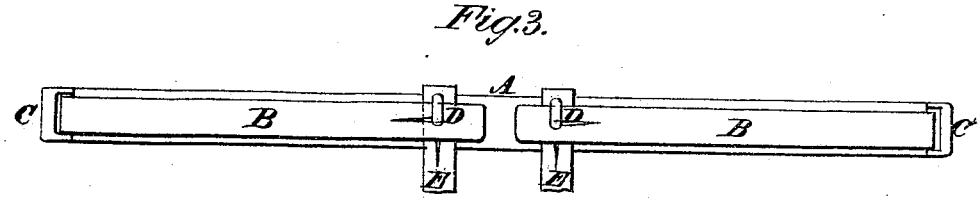
Witnesses:
John Becker.
C. Sedgwick
Inventor:
A. H. McAllister
per
Munn
Attorneys.

UNITED STATES PATENT OFFICE.

ALBERT H. McALLISTER, OF COTTON PLANT, MISSISSIPPI.

IMPROVEMENT IN WHIFFLETREES FOR DETACHING HORSES FROM VEHICLES.

Specification forming part of Letters Patent No. 132,592, dated October 29, 1872.

*To all whom it may concern:*

Be it known that I, ALBERT H. McALLISTER, of Cotton Plant, in the county of Tippah and State of Mississippi, have invented a new and useful Improvement in Whiffletree, of which the following is a specification:

Figure 1 is a top view of my improved whiffletree. Fig. 2 is a detail cross-section of the same taken through the line $x \, x$, Fig. 1. Fig. 3 is a rear view of the same.

Similar letters of reference indicate corresponding parts.

My invention has for its object to furnish an improved whiffletree, which shall be so constructed that should the horse or horses become frightened or otherwise unmanageable, or should other cause or causes render it advisable, he or they may be readily detached from the carriage and allowed to go free, and which shall be simple in construction and convenient in use; and it consists in the whiffletree provided with keepers, strap or straps, and one or two fasteners, to adapt it for use with lengthened or extended traces, as and for the purpose hereinafter more fully described.

A represents the whiffletree, the ends of which are rounded off, as shown in Fig. 1, to prevent them from cutting or wearing the traces B. The traces B are kept in place upon the ends of the whiffletree by the keepers C, which pass across the ends of the whiffletree and are secured to its end parts. The keepers C should be so formed as to fit upon the traces B and at the same time allow said traces to slide through them freely. In case the traces are round or are chains, the ends of the whiffletree should be grooved. The traces B extend along the rear edge of the whiffletree, and have holes or slits formed in them to receive the fasteners D, one or two of which may be used, and which may be hooks, as shown in the drawing, or straight spikes, or of other suitable form, the form being wholly immaterial so long as it be such as to hold the traces securely and at the same time allow them to be slipped off readily when required. E are straps, one or two of which are used according as one or two of the fasteners D are used. The end of the straps E are attached to the upper side of the whiffletree A. The straps E pass down across the rear edge of the whiffletree A, are slitted to pass over the fasteners D, and to their lower ends is attached the end of a cord or strap, E, the other end of which passes into the vehicle, and is secured in such a position that it may be conveniently reached and operated by the occupant of said vehicle. The traces may be made long to adapt them to this whiffletree, or extension straps may be buckled or otherwise secured to them, both of said arrangements being shown in Fig. 1.

Having thus described my invention, I claim as new and desire to secure by Letters Patent—

The whiffletree A provided with the keepers C, strap or straps E, and one or two fastenings, D, to adapt it for use with the lengthened traces B, substantially as herein shown and described, and for the purpose set forth.

A. H. McALLISTER.

Witnesses:
T. B. SLOAN,
JO. B. McALLISTER.